United States Patent
Westrich

[15] 3,651,989
[45] Mar. 28, 1972

[54] LIQUID METERING SYSTEM

[72] Inventor: Milton D. Westrich, 19 North Harrison Street, South Orange, N.J. 07017

[22] Filed: Mar. 24, 1970

[21] Appl. No.: 22,228

[52] U.S. Cl................................222/14, 222/59, 222/17
[51] Int. Cl.........................................................B67d 5/30
[58] Field of Search..................222/14, 59, 16, 17, 20; 137/2, 137/3, 487.5; 251/30

[56] References Cited

UNITED STATES PATENTS 3,185,344  5/1965  Kenney....................................222/20
2,803,379  8/1957  Bewley et al............................222/20

*Primary Examiner*—Robert B. Reeves
*Assistant Examiner*—James M. Slattery
*Attorney*—Robert E. Burns and Emmanuel J. Lobato

[57] ABSTRACT

Disclosed herein is a system for supplying metered amounts of liquid to a receptacle through a two-stage valve controlled by an air cylinder, which in turn is controlled by a pair of solenoid operated air valves. An electrical control means is provided wherein a selector device permits the selection of the amount of liquid which is to be pumped through the two-stage valve. When the system is first turned-on, the control means provides an electrical signal to one of the solenoids to fully open the two-stage valve. Then, shortly before the completion of pumping of the predetermined amount of liquid, a second electrical signal is coupled from the control means to the second solenoid valve causing the two-stage valve to partially close. Finally, when the full metered amount of liquid has been pumped through the valve, both solenoids are deenergized thereby closing the two-stage valve.

6 Claims, 4 Drawing Figures

PATENTED MAR 28 1972  3,651,989
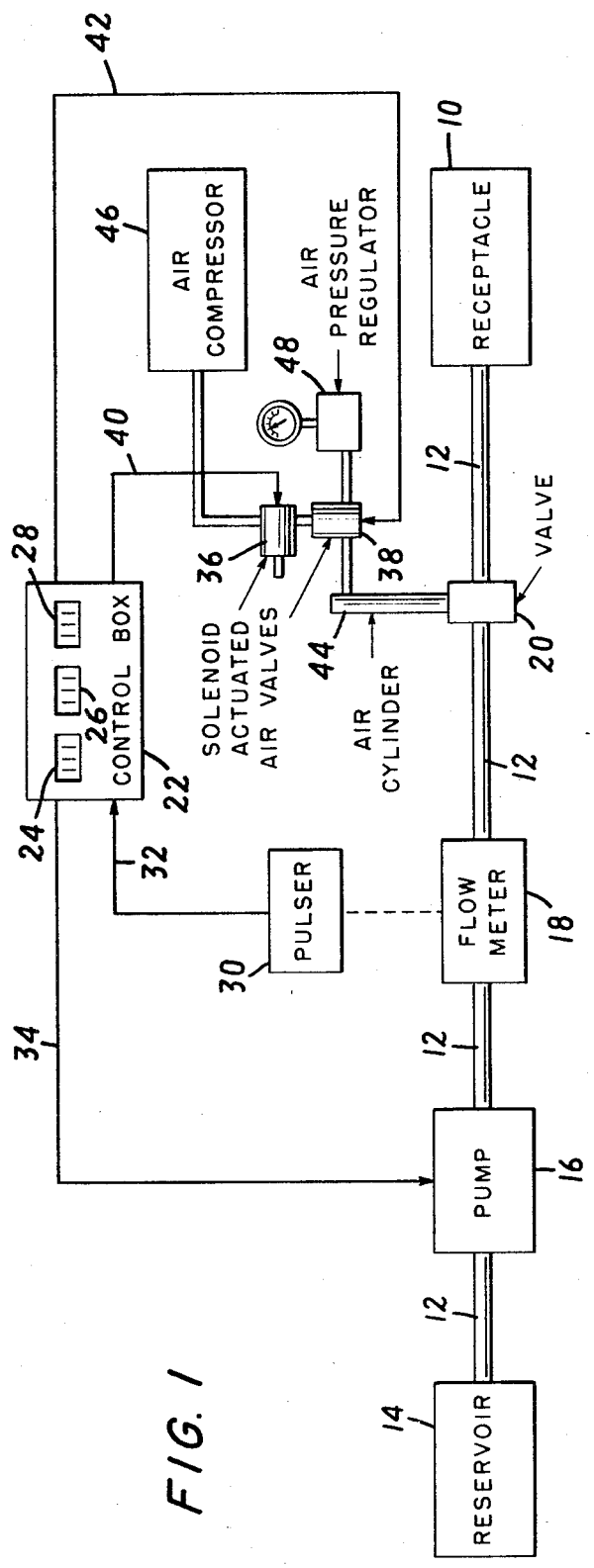
FIG. 1
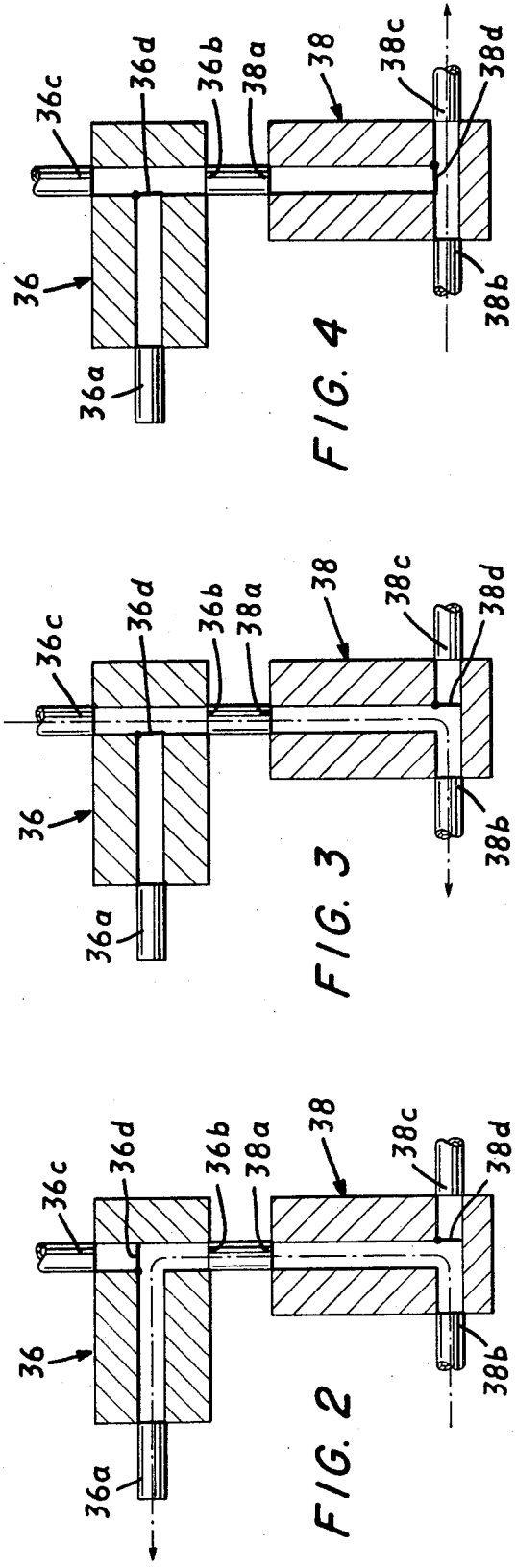
FIG. 2
FIG. 3
FIG. 4

LIQUID METERING SYSTEM

BACKGROUND OF THE INVENTION

In the past, various liquid metering systems have been proposed for accurately controlling the amount of liquid coupled to a receptacle from a reservoir. For example, such metering systems are necessary in automated chemical plants, and in automated food processing plants, such as commercial bakeries wherein various liquids must be coupled to a mixing tank for combination with dry ingredients to provide dough for the various bakery products. In the past, certain difficulties have been encountered in accomplishing all the desired results of such automated control systems. For example, it is desireable to have the control means for the liquid metering system at a location which is remote from the various reservoirs and receptacles to which they are connected. Thus, conventional hydraulic controls are expensive and inefficient for coupling the remotely located control means to the valve which controls the flow of the various liquids. Therefore, it is an object of this invention to provide a control system wherein all of the connections from the remotely located control means are in the form of relatively inexpensive electrical conductors.

In such automated liquid flow systems, it is desireable to pump the liquid at high flow rates in order to reduce the amount of time required to mix each successive batch of liquid. However, the hammer effect created in the plumbing when liquid traveling at a high rate of speed is suddenly stopped, in order to accurately control the volume of liquid which is coupled through the valve, is very severe and must be reduced in some way. Therefore, another object of this invention is to provide a liquid metering system which permits liquid to be carried at a high flow rate, but which permits accurate metering of the amount of liquid coupled through a valve while producing little or no hammer effect.

SUMMARY OF THE INVENTION

In accordance with the invention these various objects are realized by providing a metering system for coupling liquid from a reservoir to a receptacle, wherein a pump, a flow meter, and a valve are coupled in series between the reservoir and the receptacle. The flow meter has a mechanical coupling to an electrical pulser which supplies pulses to a control box, such pulses being generated in direct proportion to the amount of liquid flowing through the meter. The valve is connected for operation to an air cylinder which is normally spring biased to hold the valve in a closed position. A pair of solenoid operated air valves are connected together and to the air cylinder for actuating the cylinder to control the opening and closing of the valve. The solenoids are connected to the electrical control box, so that when the system is turned-on, one of the solenoids receives an energizing voltage to couple a supply of air from a compressor to the air cylinder, thereby operating the valve to an open position. The control box comprises means for generating another voltage shortly before the predetermined amount of flow as been fully pumped from the reservoir to the receptacle, and this second generated voltage operates the other solenoid to reduce the air pressure in the air cylinder, thereby allowing the valve to partially close so that the flow rate is appreciably diminished. Then, when the control box detects that the entire predetermined amount of flow has been completed, the solenoid energizing voltages are removed thereby removing all air pressure from the air cylinder, and causing the valve to close completely.

The partial reduction of air pressure in the air cylinder is accomplished by the solenoids which seal off the air supply to the air cylinder, but which control the escape of air from the cylinder by means of a pressure regulator connected to the air cylinder through the ports of the solenoid air valves. Thus, in effect, when the system is first turned-on, a high air pressure is applied to the air cylinder, causing it to open the valve completely; whereupon, near the completion of the pumping process, the air cylinder pressure is reduced to a desired level by means of the air regulator, so that upon completion of the pumping, the valve may be completely closed without the creation of any hammer effect. Furthermore, this apparatus permits a high degree of accuracy, since the air regulator may be adjusted so that the valve closes precisely when the desired amount of liquid has been coupled therethrough.

BRIEF DESCRIPTION OF THE DRAWINGS

The accompanying drawings illustrate one embodiment of the invention. In such drawings:

FIG. 1 is a block diagram representation of a liquid metering system embodying the invention;

FIG. 2 is an expanded sectional view of the solenoid air valves shown in FIG. 1, wherein both of the solenoids are in a deenergized condition;

FIG. 3 is a schematic representation of the solenoids shown in FIG. 2, and showing the path for air flow when one of the solenoids is energized; and FIG. 4 is a schematic representation of the solenoids shown in FIG. 2, and showing the path for air flow when both of the solenoids are energized.

DETAILED DESCRIPTION OF A PREFERRED EMBODIMENT

As illustrated in FIG. 1, a preferred embodiment of applicant's invention comprises a system for supplying metered amounts of liquid to a receptacle 10 through a series of pipe sections 12 from a reservoir 14. The flow of liquid from the reservoir to the receptacle is sustained by a pump 16, which pumps the liquid through a flow meter 18, and through a valve 20 which is controlled by two-stage operation to reduce hammer effects when the valve 20 is closed after the metered amount of flow has been completed.

The metered flow of liquid is controlled by a main control box 22, having adjustable dials 24 for preselecting the amount of liquid to be pumped. The control box 22 also has a decrementing counter display 26 for showing the amount of liquid yet to be pumped during any particular metered operation, and an incrementing display 28 to show the amount of liquid which as already been pumped during the operation. The only connections between the control box 22 and the liquid flow apparatus are accomplished by electrical conductors, so that the control box may be remotely positioned with respect to the flow apparatus, and so that such connections may be provided inexpensively, and in a minimum amount of space, while utilizing a small amount of energy for effecting such controls.

The control box 22 is responsive to electrical pulses coupled thereto from a pulsing device 30, by means of an electrical conductor 32. The pulser 30 has a mechanical connection to the flow meter 18, and cooperates therewith in a known manner to generate an electrical pulse each time a predetermined volume of liquid passes through the flow meter. For example, the shaft of the flow meter may turn a permanent magnet for operating a switch, and the linkage between the flow meter and magnet may comprise a gear train. Therefore, by adjusting the gear ratio, the frequency of generated pulses may be adjusted with respect to the flow meter 18 to generate a electrical pulse with each gallon, pint, meter, or fraction thereof, etc. The pump 16 may also be controlled by the control box by means of an electrical conductor 34, which may carry a switching current to energize the pump at desired intervals.

The control box also controls the energization of a pair of solenoid operated air valves 36 and 38, having their solenoid coils connected to the control box by conductors 40 and 42, respectively. The air valves are connected in turn to an air cylinder 44 which opens and closes the main liquid control valve 20. Compressed air is coupled through the solenoid actuated air valves to the air cylinder from a compressor 46, coupled directly to the first air valve 36. The apparatus is completed by an air pressure regulator 48 connected directly to the second air valve 38, for cooperating with the air valve 38, and the air cylinder 44 to allow partial closing of the liquid flow valve just prior to completion of the metered amount of flow.

As shown schematically, in FIG. 2, the air valves 36 and 38 are identical, each having three ports a, b and c, and a schematically shown solenoid actuated valve b which controls the interconnection of said ports in each device. In FIG. 2, each of the air valves 36 and 38 is shown with its solenoid deenergized so that there is communication from port a to b in each of those air valves. Therefore, when the system is in a passive condition, the port 38b, which is connected to the air cylinder 44, is also in communication with atmospheric pressure along the path provided by the ports 38a, 36b, and 36a. In this condition, the air cylinder, which may be spring loaded, holds the liquid control valve 20 in a tightly closed position.

When the apparatus is put into operation, however, switches on the control box 22 are manipulated to apply power along conductors 34 and 40 to energize respectively the pump 16 and the solenoid air valve 36. The valve 36d then moves to the position shown schematically in FIG. 3, so that there is an air circuit from the compressor 46 which is connected to the port 36b, through the air valve 36 and out its port 36b, through the ports 38a and 38b to the air cylinder 44, thereby applying the pressure of the air compressor to the cylinder 44 and causing it to completely open the valve 20. An air cylinder for operating a valve for a 2 inch pipe, for example, may require an air pressure of 50 p.s.i.g. When the valve 20 is in an open position, the pump 16 causes a liquid flow from the reservoir 14 to the receptacle 10, said flow passing through the meter 18. Thus, as described above, pulses from the pulser 30, in response to the operation of the flow meter 18, are coupled to the control box 22, which generates a voltage at its output lead 42, shortly before the completion of the metered amount of flow. The voltage on conductor 42 energizes the solenoid for the air valve 38 and causes the valve 38d to move to the position shown schematically in FIG. 4 wherein the supply of air from the air compressor is sealed off by the valves 36d and 38d, and wherein a path for air flow is provided between the air cylinder 44 and the regulator 48 along the route from port 38b to 38c. The air regulator 48 is adjusted to some pressure below that required to open the valve. For example, the pressure may be adjusted to 20 p.s.i.g. whereupon the 50 pounds of air within the air cylinder will partially escape through the air regulator until the pressure reaches 20 p.s.i.g., whereupon the regulator will seal the passageway through air valve 38 and retain 20 pounds of pressure in the air cylinder.

This reduced pressure on the air cylinder will allow the piston thereof to move under its spring load, thereby partially closing the valve 20 and decreasing the rate of flow. Therefore, when the last pulse of the metered amount of liquid reaches the control box 22, from the pulser 30, and when the control box 22 removes the energization voltages from the conductors 40 and 42, the valves 36d and 38d will return to their positions shown in FIG. 2 so that the 20 pound pressure which was trapped in the upper cylinder will be vented to atmospheric conditions, thereby permitting the spring loaded air cylinder to completely close the valve. Closure of the valve, requires a certain finite time, and may vary from system to system so that the apparatus is provided with a control on the air regulator 48 permitting the pressure to be increased or decreased to the value necessary to close the liquid valve 20 at the precise time required to effect the desired metered flow of liquid.

The electrical controls (not shown) within the control box 22 may comprise a plurality of counter coils responsive to the pulses from the pulser 30 to operate the displays 26 and 28 and to operate the presignal which energizes the solenoids for the air valve 38 at some predetermined number of liquid flow units before the completion of the pumping operation. That is, a counter may be provided for closing a switch to energize the solenoid for the air valve 38 at a time corresponding to a particular number of pulses prior to the last pulse for the metered flow. The control box may also include relays for latching a pushbutton start signal switch, for latching the pre-signal switch, and for operating relay contacts to switch the supply voltages for the solenoids of the air valves 36 and 38. That is, the control box 22 may be provided with a "start" pushbutton which is shorted by the contacts of a first relay which in turn is energized when the pushbutton is depressed. Said first relay also has contacts for closing a switch to supply voltage to the first solenoid air valve 36. Similarly, upon energization of the second relay, when the presignal is received, said second relay may have contacts for shorting the presignal switch thereby keeping the second relay energized, and it may have additional contacts for completing the voltage supply circuit for the solenoid of the second solenoid actuated air valve 38. Then, upon reception of the last pulse of the metered flow, the control box may have a switch which opens to deenergize both of the relays thereby removing the voltages from the solenoids 36 and 38 and removing the power from the pump 16 thereby closing off the system at the proper time.

Alternatively, the presignal function may be accomplished manually, whereby an operator may throw a switch just prior to the completion of the pumping operation, thereby energizing the solenoid for the second valve 38 and causing a reduction of the flow rate.

I claim:

1. A liquid metering system for controlling the flow of liquid from a reservoir to a receptacle comprising a flow-meter for measuring the rate of flow of the liquid; electrical pulse means mechanically connected to said flow meter for being driven thereby, said pulse means having a pulse output lead for conducting a plurality of pulses proportional in number to the unit volume of liquid which flows through the meter; a valve connected to control the flow of the liquid; air pressure responsive means mechanically coupled to said valve for opening and closing said valve to allow a metered amount of liquid to flow therethrough; electrical control means having preselecting means, having an input conductor connected to the output lead of said pulse means, and having first and second output conductors, said electrical control means being for counting said pulses, and for generating an output signal at the first output conductor to begin the metered flow, and for generating a presignal at the second output conductor corresponding to a predetermined volume of liquid flow prior to completion of flow of said preselected volume, and for terminating said output signal and presignal upon flow completion of said preselected volume; first and second electrically operated air valve means for controlling the air pressure coupled to said air pressure responsive means, said first air valve means having said first output conductor coupled thereto for operation to control said air responsive means to open said valve completely; and an air regulator having a conduit connected directly to said second air valve means, said second air valve means having said second output conductor connected thereto for operation to bleed off air from said air responsive means through said regulator to partially close said valve and to reduce the rate of flow prior to completion of the metered flow, thereby reducing the hammer effect at said completion.

2. A liquid metering system for controlling the flow of liquid from a reservoir to a receptacle comprising a flow-meter for measuring the rate of flow of the liquid; electrical pulse means mechanically connected to said flow meter for being driven thereby, said pulse means having a pulse output lead for conducting a plurality of pulses proportional in number to the unit volume of liquid which flows through the meter; a valve connected to control the flow of the liquid; air pressure responsive means mechanically coupled to said valve for opening and closing said valve to allow a metered amount of liquid to flow therethrough; electrical control means having preselecting means, having an input conductor connected to the output lead of said pulse means, and having first and second output conductors, said electrical control means being for counting said pulses, and for generating an output signal at the first output conductor to begin the metered flow, and for generating a presignal at the second output conductor corresponding to a predetermined volume of liquid flow prior to completion of flow of said preselected volume, and for terminating said output signal and presignal upon flow completion of said preselected volume; first and second electrically operated three-port air valves for controlling the air pressure coupled to said air pressure responsive means, said first air valve having said first output conductor coupled thereto for operation to control said air responsive means to open said valve completely; and an air regulator having a conduit connected directly to said second air valve means, said second air valve means having said second output conductor connected thereto for operation to bleed off air from said air responsive means through said regulator to partially close said valve and to reduce the rate of flow prior to completion of the metered flow, thereby reducing the hammer effect at said completion, wherein one port of one of said air valves is for connection to a pressurized source of air; said air pressure regulator is connected to one port of the other air valve; and said electrically operated air valves are arranged to provide communication from said one port of said one air valve to said air pressure responsive means upon reception of said output signal, and to provide communication between the air pressure responsive means and said one port of said other air valve upon reception of the presignal to allow the air pressure to decrease to the pressure level of the regulator thereby partially closing the valve.

3. The invention as set forth in claim 2, in which said regulator is adjustable.

4. The invention as set forth in claim 2, in which said electrically operated air valves comprise solenoid controlled devices for controlling communication of the ports, said first air valve being connected to said second air valve, and said second air valve being connected to said air pressure responsive means and said air pressure regulator, wherein under the condition that both air valve solenoids are deenergized, ports of the air valves provide communication between said air pressure responsive means and the atmosphere; wherein under the condition that only the first air valve solenoid is energized, the air valves provide communication between said air pressure responsive means and said one port of said first air valve; and wherein under the condition that both air valve solenoids are energized, the air valves provide communication between said air pressure responsive means and said air pressure regulator.

5. The invention as set forth in claim 4 in which said electrical control means is remotely positioned with respect to all other elements of said system, and in which all connections between said control means and said other elements are completed by electrical conductors.

6. The invention as set forth in claim 1, in which said electrical control means is remotely positioned with respect to all other elements of said system, and in which all connections between said control means and said other elements are completed by electrical conductors.

* * * * *